US012122323B2

(12) United States Patent
Kraemer

(10) Patent No.: US 12,122,323 B2
(45) Date of Patent: Oct. 22, 2024

(54) METHOD FOR OPERATING A VEHICLE, DEVICE AND VEHICLE

(71) Applicant: Bayerische Motoren Werke Aktiengesellschaft, Munich (DE)

(72) Inventor: Oliver Kraemer, Riedering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 203 days.

(21) Appl. No.: 17/771,707

(22) PCT Filed: Nov. 10, 2020

(86) PCT No.: PCT/EP2020/081629
§ 371 (c)(1),
(2) Date: Apr. 25, 2022

(87) PCT Pub. No.: WO2021/104850
PCT Pub. Date: Jun. 3, 2021

(65) Prior Publication Data
US 2022/0379840 A1    Dec. 1, 2022

(30) Foreign Application Priority Data
Nov. 26, 2019   (DE) ..................... 10 2019 131 946.3

(51) Int. Cl.
*B60R 25/04*   (2013.01)
*B60R 25/10*   (2013.01)
(Continued)

(52) U.S. Cl.
CPC .......... *B60R 25/04* (2013.01); *B60R 25/1003* (2013.01); *B60R 25/24* (2013.01); *B60R 25/30* (2013.01)

(58) Field of Classification Search
CPC ..... B60R 25/04; B60R 25/1003; B60R 25/24; B60R 25/30; B60R 25/10; B60R 25/045
See application file for complete search history.

(56) References Cited

U.S. PATENT DOCUMENTS 5,604,384 A   2/1997  Carlo et al.
9,894,492 B1* 2/2018  Elangovan ............ H04W 4/023
                      (Continued)

FOREIGN PATENT DOCUMENTS

CN    105793121 A    7/2016
CN    107187421 A    9/2017
                    (Continued)

OTHER PUBLICATIONS

Alrabady et al.; Analysis of Attacks Against the Security of Keyless-Entry Systems for Vehicles and Suggestions for Improved Designs; IEEE Transactions on Vehicular Technology, vol. 54, No. 1, Jan. 2005 (Year: 2005).*

(Continued)

*Primary Examiner* — Michael J Zanelli
(74) *Attorney, Agent, or Firm* — Crowell & Moring LLP

(57) ABSTRACT

A method for operating a vehicle includes monitoring for a presence of an assigned authorization element in the vehicle during operating the vehicle and operating the vehicle in a secure state when the assigned authorization element is not detected, where a performance parameter of the vehicle is at least temporarily modified in the secure state.

14 Claims, 3 Drawing Sheets

(51) Int. Cl.
*B60R 25/24* (2013.01)
*B60R 25/30* (2013.01)

(56) References Cited

U.S. PATENT DOCUMENTS

| | | | |
|---|---|---|---|
| 10,081,332 B2 | 9/2018 | Maihoefer | |
| 10,415,528 B2 * | 9/2019 | Chaplow | B60R 25/24 |
| 10,870,411 B1 * | 12/2020 | Schafer | G07C 9/28 |
| 11,046,287 B1 * | 6/2021 | Schafer | B60R 25/007 |
| 2013/0271273 A1 * | 10/2013 | Oesterling | G07C 9/00309 |
| | | | 340/426.18 |
| 2017/0267213 A1 | 9/2017 | Berezin et al. | |
| 2018/0186334 A1 | 7/2018 | Munafo et al. | |

FOREIGN PATENT DOCUMENTS

| | | | |
|---|---|---|---|
| CN | 109562739 A | 4/2019 | |
| CN | 110167817 A | 8/2019 | |
| DE | 102010048393 A1 * | 4/2012 | B60R 25/24 |
| DE | 10 2011 016 889 A1 | 10/2012 | |
| DE | 10 2013 020 333 A1 | 6/2015 | |
| DE | 102016100986 A1 * | 8/2016 | G07C 9/00309 |
| DE | 10 2016 214 687 A1 | 2/2018 | |
| DE | 10 2018 201 071 A1 | 7/2019 | |
| EP | 0 610 902 A2 | 8/1994 | |
| FR | 2791935 A1 * | 10/2000 | B60R 25/04 |
| WO | WO-2014191537 A1 * | 12/2014 | B60R 16/023 |
| WO | WO 2018/028857 A1 | 2/2018 | |

OTHER PUBLICATIONS

Chinese Office Action issued in Chinese application No. 202080068779.4 dated Jun. 2, 2023, with English translation (Seventeen (17) pages).
PCT/EP2020/081629, International Search Report dated Feb. 12, 2021 (Two (2) pages).
German Search Report issued in German application No. 10 2019 131 946.3 dated Dec. 3, 2019, with Statement of Relevancy (Nine (9) pages).

* cited by examiner

METHOD FOR OPERATING A VEHICLE, DEVICE AND VEHICLE

BACKGROUND AND SUMMARY OF THE INVENTION

The present application relates to a method for operating a vehicle, a device, and a vehicle.

So-called keyless access systems are available for vehicles, in which the user of the vehicle receives access to the vehicle by carrying along an access element, without the access element having to be actuated for this purpose. After the access check has been successfully completed and the engine is started, the vehicle can also be used when the access element is not or is no longer present in the vehicle.

One object is to make the unauthorized usage of a vehicle more difficult.

A method is specified for operating a vehicle, for example a motor vehicle.

According to at least one embodiment of the method, a presence of an assigned authorization element in the vehicle is monitored in operation of the vehicle. In particular, the monitoring for the presence of the assigned authorization element takes place during travel, thus also after the starting of the engine.

In general, an element which can be carried along by a user of the vehicle, to which the authorization element belongs, and which is capable of transmitting an authorization signal to a vehicle-side control unit is referred to as an assigned authorization element. For example, the authorization element is designed as part of a key fob or as a key fob. In other words, the assigned authorization element represents an "electronic key" for an authorization check for use of the vehicle, for example, for access to the interior of the vehicle and/or the luggage compartment and/or for starting the engine. Multiple authorization elements can also be assigned for one vehicle, for example, for one or more persons authorized by the owner of the vehicle.

According to at least one embodiment of the method, the vehicle is operated in a secure state when no assigned authorization element is detected. The vehicle can thus be put from a normal state into the secure state when the check for an assigned authorization element is not successful. In other words, the secure state represents an operating mode which is a reaction to a deviation from the normal state.

According to at least one embodiment of the method, at least one performance parameter of the vehicle is at least temporarily modified in the secure state. In general, a parameter which has a direct or indirect influence on the performance of the vehicle is considered to be a performance parameter. In particular, the at least one performance parameter is modified in such a way that the performance of the vehicle in the secure state is reduced in relation to the performance of the vehicle in the normal state. In the secure state, the vehicle is thus at least temporarily put into a state in which the performance of the vehicle is deliberately reduced. For example, the performance parameter has direct or indirect influence on the forward motion of the vehicle. For example, a performance parameter is at least temporarily reduced to a value of at most 70% of the original value. For example, the value after the passage of a predefined time since the beginning of the secure state, for example after one minute, is between 40% inclusive and 60% inclusive, for example 50% of the original value in the normal state. The at least one performance parameter can then be throttled further, for example, to at most 20% or at most 10%.

In at least one embodiment of the method for operating a vehicle, a presence of an assigned authorization element is monitored in operation of the vehicle and the vehicle is operated in a secure state if no assigned authorization element is detected. At least one performance parameter of the vehicle is at least temporarily modified in the secure state.

A check as to whether an assigned authorization element is present in the vehicle interior thus also takes place after starting of the vehicle. If the vehicle is being used by an unauthorized party who is not in possession of an assigned authorization element, getting away with the vehicle can be made significantly more difficult by putting the vehicle in the secure state, in particular in comparison to a vehicle having a conventional vehicle security system, in which an unauthorized party can use a vehicle having running engine without restrictions as long as the motor is not turned off. In the unfavorable case, the vehicle can be driven quickly and over great distances to a location that is safe for the unauthorized user and/or over national borders.

According to at least one embodiment of the method, the at least one performance parameter is throttled as a function of a duration since the beginning of the secure state. For example, the performance parameter is throttled at least temporarily in ramps. For example, the throttling takes place continuously or at least in sufficiently small steps that the vehicle is not abruptly braked. It is thus possible to avoid a hazard for the vehicle or other road users resulting due to the throttling of the performance parameter.

According to at least one embodiment of the method, the at least one performance parameter is throttled in a first stage of the secure state with a lesser slope in absolute value than in a second stage chronologically following the first stage. In case of doubt, the specified slopes each relate to the mean slopes in the respective stages. The first stage begins, for example, immediately at the beginning of the secure state, thus at the point in time at which an assigned authorization element is no longer detected.

Preferably, no or no significant modification, in particular throttling, of the at least one performance parameter takes place in the first stage. The first stage thus represents a waiting time in which it is possible to continue to drive in an unrestricted or at least substantially unrestricted manner. If the detection of the assigned authorization element was unsuccessful due to a brief malfunction of the data transfer and this malfunction is remedied within the first stage, the vehicle can be put back into the normal state from the secure state without restrictions in the driving comfort resulting for the authorized driver of the vehicle. For example, a duration of the first stage is between 5 seconds inclusive and 1 minute inclusive. The secure state can also have more than two stages, wherein the slope of the performance parameter can vary between each of the stages.

According to at least one embodiment of the method, a notice is output to the driver during the secure state that the authorization element is not detected. This notice expediently already takes place during the first stage of the secure state. The driver can thereupon check for possible causes for the non-detection of the authorization element and possibly remedy them.

According to at least one embodiment of the method, the monitoring of the presence of the assigned authorization element is carried out repeatedly in operation of the vehicle. For example, the monitoring takes place continuously or at regular intervals, for example, at intervals between 0.1 seconds inclusive and 30 seconds inclusive. The shorter the interval between two checks is, the faster the vehicle can be put into the secure state.

According to at least one embodiment of the method, a pairing attempt between an authorization control unit of the vehicle and the assigned authorization element takes place to monitor the presence of the assigned authorization element, in particular by means of a wireless connection. For example, the wireless connection takes place via radio, for example in the kilohertz or megahertz range, Bluetooth, near field communication (NFC), or WLAN (wireless local area network).

According to at least one embodiment of the method, an authorization code changes over time. An assigned authorization element thus does not continuously transmit the same authorization code, but rather an authorization code changing over time. It is thus made more difficult for unauthorized parties to simulate an assigned authorization element.

According to at least one embodiment of the method, the at least one performance parameter is a parameter which influences an engine controller of the vehicle. For example, the performance parameter is a maximum velocity or a maximum torque of the vehicle. In the secure state, a deliberate electronic throttling of the performance of the engine can thus take place.

For example, the maximum velocity is throttled at least temporarily to a value between 40 inclusive and 80 km/h inclusive, preferably between 50 inclusive and 70 km/h inclusive. In the event of an incorrect nondetection of the authorization element, the driver of the vehicle can move to a safe location, for example, a nearby parking area. At the same time, the throttled maximum velocity is sufficiently low that getting away over larger distances is impossible or at least greatly restricted.

According to at least one embodiment of the method, two or more performance parameters of the vehicle are modified in the secure state, in particular throttled. For example, throttling of the maximum velocity and the maximum torque takes place. The modification of the performance parameters can be carried out here over different periods of time of the secure state and/or with different slopes.

According to at least one embodiment of the method, a change takes place from the secure state into the normal state of the vehicle when the assigned authorization element is detected again. The authorized driver can thus again use the vehicle with the original full performance.

Furthermore, a device is specified which is designed to carry out the above-described method. For example, the method is implemented as a computer program, wherein the execution of the computer program by the device causes the vehicle, in particular the device, to carry out the method. The device expediently has a data connection to an authorization control unit of the vehicle.

According to at least one embodiment of the device, the device is an engine control unit of the vehicle or has a data connection to an engine control unit of the vehicle. A particularly direct intervention in the performance of the vehicle, in particular the performance of the engine, can thus be performed. Usage of the vehicle is thus made more difficult for unauthorized parties.

Furthermore, a vehicle having an above-described device is specified.

According to one embodiment of the vehicle, the assigned authorization element is configured to enable handling-free access to the vehicle for a driver, in particular to enable the vehicle operation. Handling-free in this context means that the driver only has to carry along the assigned authorization element to be able to use the vehicle. A very comfortable access for using the vehicle is thus available to the driver, wherein at the same time using and in particular getting away after stealing the vehicle by unauthorized parties is made significantly more difficult.

Further embodiments and practical features result from the following description of the exemplary embodiments in conjunction with the figures.

The figures are each schematic illustrations and are therefore not to scale. Rather, individual elements can be shown exaggeratedly large for improved illustration and/or improved comprehension.

DETAILED DESCRIPTION OF THE DRAWINGS

Figure 1:
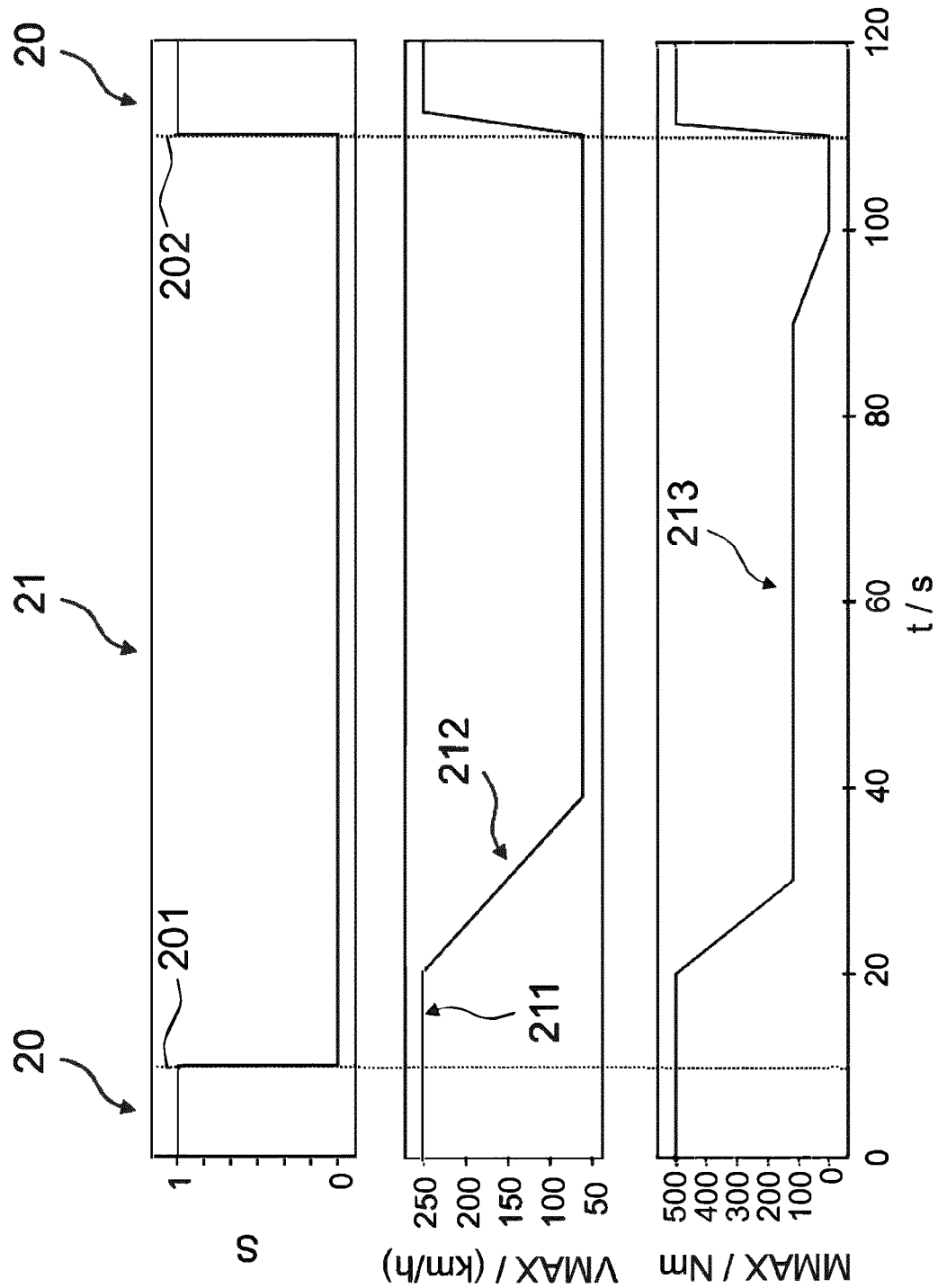
FIG. 1 shows an illustration of the functional principle of a method on the basis of an exemplary curve.

FIG. 1 shows an exemplary sequence for a described method, wherein a logical signal S having the signal values 1 or 0, a maximum velocity VMAX in km/h and a maximum torque MMAX in Nm are each plotted as a function of the time t in seconds.

The signal S represents the result of a check for the presence of an assigned authorization element here, wherein, for example, the signal value 1 stands for a successful check and the signal value 0 stands for an unsuccessful check.

At the point in time t=0, an assigned authorization element is detected. A normal state 20 is accordingly present. At a first point in time 201, an assigned authorization element is no longer detected. The signal S drops from the original signal value 1 to 0.

At this first point in time 201, a change takes place into a secure state 21. In a first stage 211 of the secure state 21, a driver of the vehicle receives a notice, for example, that an assigned authorization element has no longer been detected. Within the first stage 211, however, an intervention does not yet take place in the performance parameters of the vehicle, so that the driver can continue to drive for a brief time without restrictions, in the example shown for 10 seconds. In particular, the driver would not experience any restrictions in comfort if the assigned authorization element was not correctly detected only briefly due to malfunction and this malfunction ends during the duration of the first stage 211.

In a second stage 212 of the secure state 21, both the maximum velocity VMAX and also the maximum torque MMAX are reduced in ramps. Due to the ramped reduction of the maximum velocity VMAX, abrupt braking of the vehicle and possible endangerment to the driver or other road users accompanying this are avoided. For example, the maximum velocity is reduced to 60 km/h.

The maximum torque MMAX is lowered by way of example in two steps in ramps, wherein the maximum torque is at a lower threshold value 213 not equal to zero, for example approximately 100 Nm, after passage of the first ramp, for example at the point in time t=30 s, which is high enough that the driver can move away from a hazardous situation by acceleration. During the second ramp, for example between t=90 s and t=100 s, the maximum torque MMAX is continuously reduced to 0, so that the motor of the vehicle no longer enables any positive acceleration.

In the secure state 21, in particular after passage of the first stage 211, the performance of the vehicle is thus significantly restricted. Therefore, even if an unauthorized party has succeeded in obtaining access to the vehicle and starting the engine, it is ensured by the repeated monitoring for the presence of an assigned authorization element during travel that a change into the secure state takes place and it is only possible to drive away with the vehicle from the location of the theft in a very restricted manner.

At the same time, it is ensured that an authorized driver, for the case in which his assigned authorization element is no longer detected due to a malfunction, can still move the vehicle to a safe location in spite of the restriction of the performance of the vehicle.

Furthermore, the case is illustrated in FIG. 1 that an assigned authorization element is detected again.

At a second point in time 202, the check for detection of an assigned authorization element is successful and the signal S accordingly rises to the assigned original signal value 1. A change takes place from secure state 21 into the normal state 20. The maximum velocity VMAX and the maximum torque MMAX can be increased again to the original level. This expediently takes place in such a way that a sudden acceleration not intended by the driver or an abrupt increase of the velocity of the vehicle does not take place. For example, the maximum velocity VMAX and the maximum torque MMAX are increased in ramp form. The slope can also be greater in absolute value here than upon the change from the normal state 20 into the secure state 21.

Of course, various modifications of the exemplary curve can be performed without deviating from the basic concept of the present application. For example, only one performance parameter, such as only the maximum velocity or only the maximum torque or also another performance parameter, can also be modified.

The level of the performance parameter or the performance parameters in the secure state 21 and the slope of the performance parameter or the performance parameters can also differ. For example, the slope can be not constant, but rather vary at least temporarily as a function of time.

Furthermore, a modification of one or more performance parameters can also already take place in the first stage 211 of the secure state 21. Expediently, however, the absolute value of the slope of the performance parameter in the first stage 211 is less than in the following second stage 212.

The duration of the first stage 211 can also be varied and can be, for example, between 5 seconds inclusive and 1 minute inclusive. Furthermore, it is also conceivable to omit the first stage 211.

Figure 2:
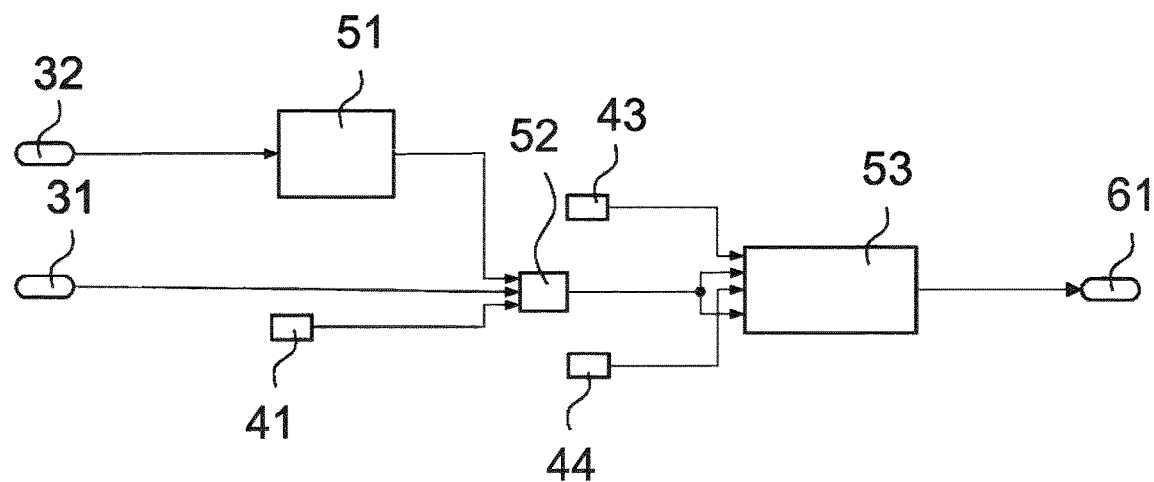
FIG. 2 shows a schematic illustration of a functional logic for a method according to one exemplary embodiment.

A functional logic is illustrated in FIG. 2, in which the maximum velocity is modified as the performance parameter in the secure state.

The functional logic receives as variable inputs a status of the authorization detection 31 and a time 32 since the beginning of the secure state. The time 32 since the beginning of the secure state is supplied to a characteristic map 51. The status of the authorization detection 31 is supplied to a status check 52. Furthermore, the functional logic receives parameters for the maximum velocity in the normal state 41, a positive gradient factor 43, and a negative gradient factor 44.

A maximum velocity 61 is output as the output. For the case in which the status of the authorization detection 31 is positive, the maximum velocity 61 corresponds to the maximum velocity in the normal state 41.

On the other hand, thus in the secure state, the maximum velocity is modified as a function of the time 32 since the beginning of the secure state by means of the maximum value producer 51 and the gradient producer 53.

Figure 3:
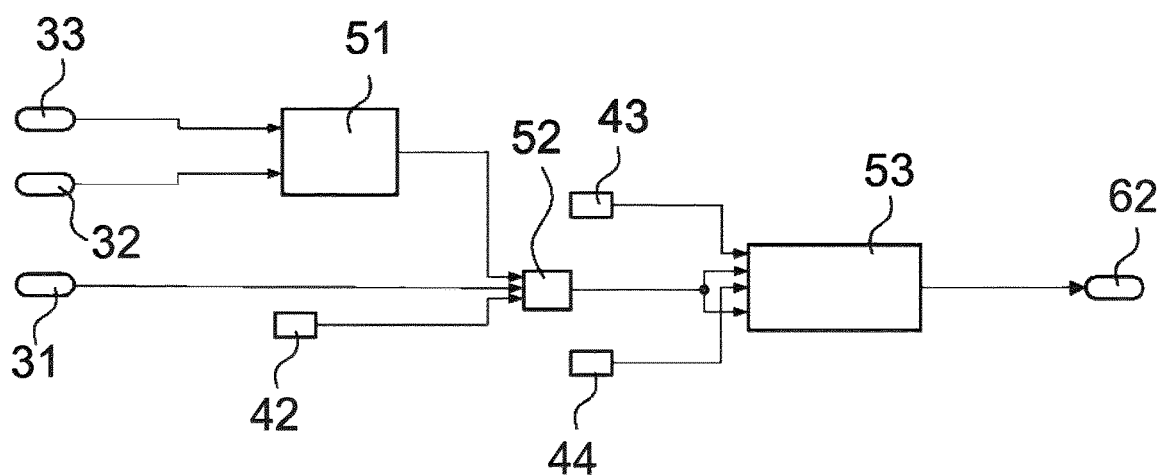
FIG. 3 shows a schematic illustration of a functional logic for a method according to one exemplary embodiment.

A corresponding functional logic is shown in FIG. 3, in which the maximum torque is modified as the performance parameter in the secure state.

This functional logic essentially corresponds to the functional logic described in conjunction with FIG. 2. In contrast thereto, the functional logic receives as an additional variable input an engine speed 33.

Furthermore, in place of the maximum velocity, the maximum torque 42 in the normal state is specified as the parameter. As the output, the functional logic supplies a maximum torque 62, which, as a function of the status of the detection of an assigned authorization element, is the maximum torque in the normal state or a reduced maximum torque.

Figure 4:
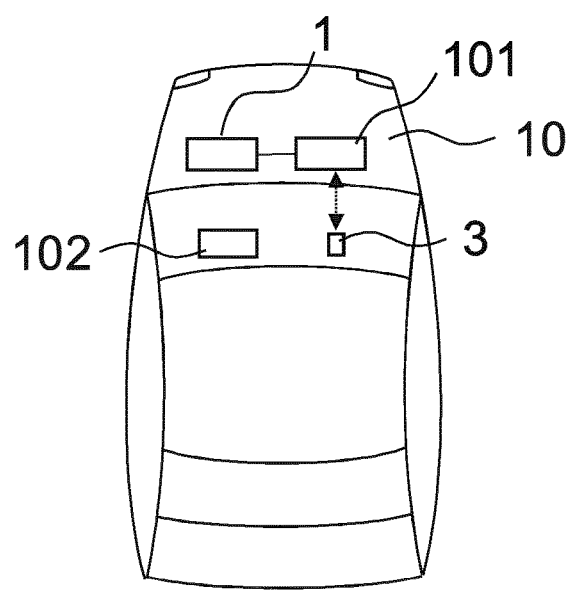
FIG. 4 shows an exemplary embodiment for a vehicle having a device for carrying out the method.

An exemplary embodiment of a vehicle 10 having a device 1 is shown in FIG. 4, wherein the device is designed to carry out the above-described method. For example, the device 1 is an engine control unit of the vehicle 10 or the device has a data connection to the engine control unit of the vehicle.

The device 1 has a data connection to an authorization control unit 101, which monitors the presence of an assigned authorization element 3 in the interior of the vehicle 10 and supplies a corresponding signal to the device. Such authorization checking systems are also referred to as keyless go or as comfort access.

If an assigned authorization element 3 is not detected in operation of the vehicle, the driver of the vehicle can be informed about this, for example, by a corresponding notice on a display device 102 in the field of view of the driver.

The assigned authorization element 3, for example, in the form of a key fob or a mobile electronic device, is designed in particular to enable an authorized driver of the vehicle 10 access to the interior of the vehicle 10 and starting of the engine in a handling-free manner, thus only by carrying it along. For this purpose, for example, a pairing takes place between the assigned authorization element 3 and the authorization control unit. An authorization code accepted on the part of the authorization control unit 101 can change over time to increase the security of the authorization check.

Overall, using the described method and such a device, a use of the vehicle by unauthorized parties can be made significantly more difficult without restricting the operating comfort of an authorized driver.

LIST OF REFERENCE CHARACTERS

1 device
10 vehicle
101 authorization control unit
102 display device
20 normal state
201 first point in time
202 second point in time
21 secure state
211 first stage
212 second stage
213 lower threshold value
31 status of the authorization detection
32 time since the beginning of the secure state
33 engine speed 41 maximum velocity in the normal state
42 maximum torque in the normal state
43 positive gradient factor
44 negative gradient factor
51 characteristic map/line
52 status check
53 gradient producer
61 maximum velocity
62 maximum torque

What is claimed is:

1. A method for operating a vehicle, comprising the steps of:
monitoring for a presence of an assigned authorization element in the vehicle during operating the vehicle; and
operating the vehicle in a secure state when the assigned authorization element is not detected, wherein a performance parameter of the vehicle is at least temporarily modified in the secure state, and wherein the performance parameter is a maximum velocity of the vehicle or a maximum torque of the vehicle.

2. The method according to claim 1, wherein the performance parameter is throttled as a function of a duration since a beginning of the secure state.

3. The method according to claim 1, wherein the performance parameter is throttled in a first stage of the secure state using a slope less in absolute value than in a second stage following the first stage with respect to time.

4. The method according to claim 1, wherein during the operating in the secure state, a notice is output to a driver of the vehicle that the assigned authorization element is not detected.

5. The method according to claim 1, wherein the monitoring is carried out repeatedly during operating the vehicle.

6. The method according to claim 1, wherein for the monitoring, a pairing attempt takes place between an authorization control unit of the vehicle and the assigned authorization element by a wireless connection.

7. The method according to claim 1, wherein an authorization code transmitted by the assigned authorization element changes over time.

8. The method according to claim 1, wherein the performance parameter and a further performance parameter of the vehicle are throttled in the secure state.

9. The method according to claim 1, wherein the performance parameter is throttled at most down to a lower threshold value up to a predefined duration since a beginning of the secure state.

10. The method according to claim 1, wherein a change from the secure state into a normal state of the vehicle takes place when the assigned authorization element is detected.

11. A device which is configured to perform the method according to claim 1.

12. The device according to claim 11, wherein the device is an engine control unit of the vehicle or has a data connection to an engine control unit of the vehicle.

13. A vehicle, comprising:
a device which is configured to perform the method according to claim 1.

14. The vehicle according to claim 13, wherein the assigned authorization element is configured to enable handling-free access to the vehicle for a driver of the vehicle.

* * * * *